United States Patent [19]

Biggel

[11] Patent Number: 5,426,863

[45] Date of Patent: Jun. 27, 1995

[54] TAPE MEASURE

[75] Inventor: Emil J. Biggel, Manila, Philippines

[73] Assignee: Solar Wide Industrial, Ltd., Kwai Chung, Hong Kong

[21] Appl. No.: 107,655

[22] PCT Filed: Feb. 20, 1992

[86] PCT No.: PCT/GB92/00307

§ 371 Date: Dec. 3, 1993

§ 102(e) Date: Dec. 3, 1993

[87] PCT Pub. No.: WO92/14986

PCT Pub. Date: Sep. 3, 1992

[30] Foreign Application Priority Data

Feb. 20, 1991 [GB] United Kingdom ............... 9103553

[51] Int. Cl.6 ............................................... G01B 3/10
[52] U.S. Cl. ......................................... 33/763; 33/707
[58] Field of Search ................. 33/762, 763, 755, 706, 33/707; 377/18; 250/237 R

[56] References Cited

U.S. PATENT DOCUMENTS

| 4,161,781 | 7/1979 | Hildebrandt et al. | 33/763 X |
| 4,195,348 | 3/1980 | Kakutani | 33/763 X |
| 4,427,883 | 1/1984 | Betensky et al. | 33/763 X |

FOREIGN PATENT DOCUMENTS

| 0054407 | 3/1986 | Japan | 33/763 |
| 0104213 | 5/1986 | Japan | 33/763 |

*Primary Examiner*—Alvin Wirthlin
*Attorney, Agent, or Firm*—Leydig, Voit & Mayer, Ltd.

[57] ABSTRACT

A combined tape measure and calculator is arranged with equally spaced holes along the length of its tape. The holes are read by a number of closely spaced optical readers arranged to generate incremental unit signals for a microprocessor mounted in a case of the tape measure.

17 Claims, 5 Drawing Sheets

TAPE MEASURE

FIELD OF THE INVENTION

The invention relates more particularly to an electronic tape measure with a digital display.

BACKGROUND OF THE INVENTION

Electronic tape measures with a digital display are already available and often include a calculator, mounted on a case incorporating a wound tape, for use as a normal calculator and/or for use in computing various information based on one or more distances measured by the tape measure.

The distance measured in all these devices requires some arrangement for determining the length of tape which has been drawn out of the case at any time as well as determining, as the tape is moved, whether the tape is being moved out of or in to the case. A digital display is provided for displaying, usually at all times, the amount, that is the length, of tape which is currently extending out of the case.

The most direct way of monitoring the tape is to "read" optical, magnetic or other markings on the tape itself. It has already been proposed to provide equally spaced perforations in the tape and to sense movement of the tape by exposing the tape to a light source on one side of the tape and sensing light that passes through the perforations as the tape moves past the sensor. Such arrangements cannot in themselves provide an indication of which direction the tape is moving and are particularly inaccurate if the tape judders, sensitivity of the sensor varies or the intensity of the light source changes, and so on.

Further, the resolution of such arrangements cannot be very high without significantly weakening the strength of the tape, that is, other than by having very many perforations per unit length.

SUMMARY OF THE INVENTION

According to the invention there is provided an electronic tape measure comprising a case having a digital display and including a microprocessor, an extendible tape wound on a reel in the case which can be withdrawn from the case to carry out measurements, a number of equal displaced readable unit markings on the tape and a reader for reading the markings as the tape is moved out of and into the case, in which the reader has a number of separate reading devices displaced lengthwise with respect to the tape and displaced from one another to extend over a distance equal to the separation of markings on the tape for providing signals representing incremental units of movement of the tape, the markings and the reading devices being arranged so that discrete sequential incremental signals are developed by the reading devices corresponding to positions whenever a mark of the tape is read by either a single reading device or two adjacent reading devices at any one time, the outputs of the reading devices being provided to the microprocessor as the incremental unit signals.

The unit markings may comprise holes in the tape and the reading devices comprise photocells.

The unit markings may be arranged at one cm. or one inch intervals along the length of the tape.

A digital calculator may be mounted on the case having a dedicated digital display. The measurements made by the tape may be supplied to the calculator.

A combined electronic tape measure and calculator according to the invention will now be described by way of example with reference to the accompanying drawings in which:

BRIEF DESCRIPTION OF THE DRAWINGS

FIG. 6 shows the sequential logic of outputs received from the photocells when the tape measure is used.

DETAILED DESCRIPTION OF THE PREFERRED EMBODIMENTS

Figure 1:
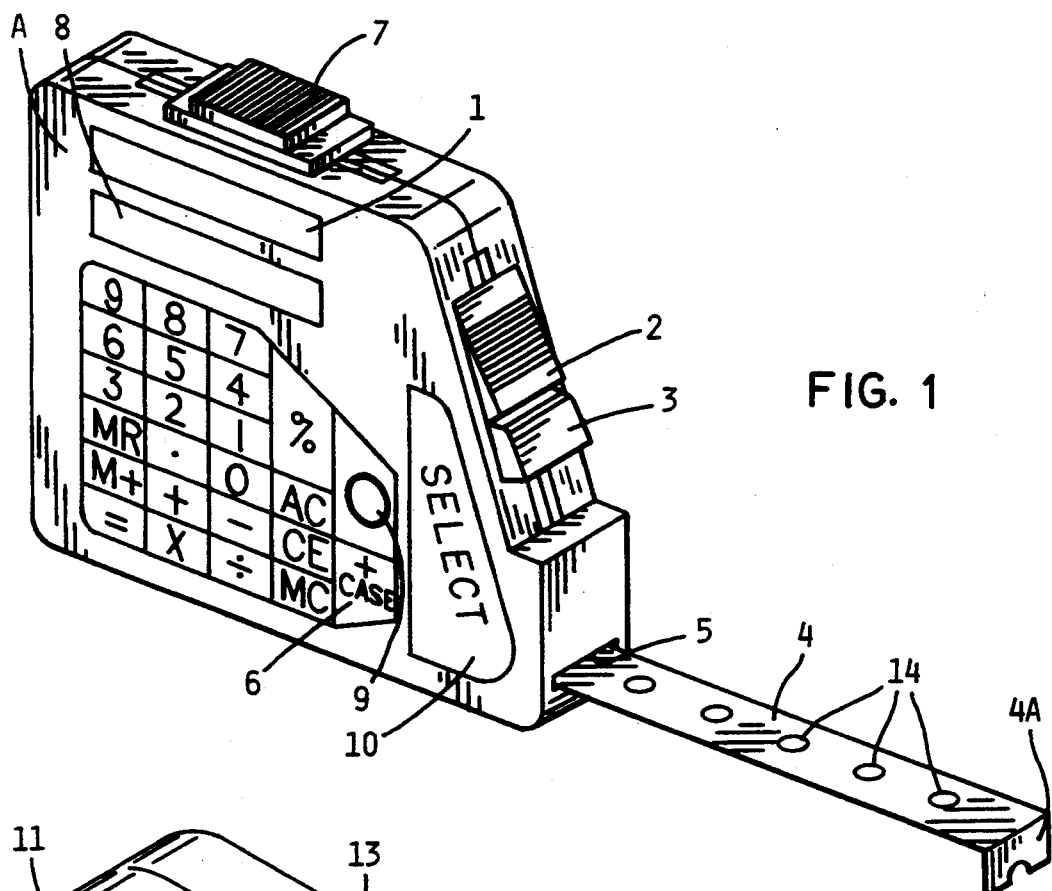
FIG. 1 is an isometric view of the measure and calculator.

Referring to the drawings, in FIG. 1 a plastics casing A is provided with an LCD display 1, a sliding mechanical tape locking button 2, an ENTER key 3 for use in entering a tape measurement to store the measurement in memory. A tape 4 which has a conventional tip 4A is used to measure distances between the tip 4A and a mouth 5 of the casing A. A (+case) key 6 when pressed adds the length of the casing A to any measurement so the tape measure can be used to measure from the tip 4A to the rear of the casing opposite the mouth 5.

A power switch 7 turns the power ON and OFF. An LCD display 8 is for use with a generally conventional calculator mounted in the side of the casing A having a usual keyboard as shown for use with the calculator. A key 9 is provided for circular computations. If circle diameter is measured by the tape and the key 9 pressed once, the circumference of the circle will be displayed on display 1, if the key 9 is pressed twice, the area of the circle will be displayed.

The tape 4 is provided with apertures 14 at unit intervals of 1 centimeter. A SELECT key 10 is mounted on the side of the casing A.

Measuring an object is carried out using the tape measure placing its tip 4A at one end of the object to be measured and the mouth 5 of the plastic casing at the other end of the object and then pressing the ENTER key 3. The measurements are shown instantaneously on the measurement display 1 while moving the tape. Pressing ENTER key 3 causes the measurement at that instant to be stored in a memory. The locking button 2 prevents the tape from retracting back into the case.

While the calculator can be used as an ordinary 8-digit-display calculator with four fundamental functions, percentage computation, All Clear (AC), Clear Entry (CE), and Memory Recall (MR), it can also be used interactively with the tape measurements. This is without having to transfer from a certain mode to another or having to re-enter the measurements manually on the numeric keyboard. After entering a tape measurement by pressing the ENTER key 3, the measurement can be readily multiplied or divided with a certain number or be included in a series of computations by simply pressing Memory Recall (MR) since the tape measurement is automatically stored in the memory once ENTER key 3 is pressed.

This electronic measure features five selectable functions. The default function is single entry. Everytime ENTER key 3 is pressed the memory is overwritten with the current tape measurement. Pressing SELECT key 10 the first time leads to function two which performs the summation of lengths. This means that pressing ENTER will add the current tape measurement to the previous entered measurement, and the next entry will be added to the sum of the previous ones and so on. Pressing SELECT key 10 the second time will lead to function three which is area computation. That is, the second tape measurement entry will be multiplied to the first one. Pressing again SELECT key 10 will lead to function four which is volume computation. This is similar to function three but can accommodate up to three entries unlike function three which is limited to two entries only. Pressing SELECT key 10 the fourth time will finally lead to function five. This function is a combination of the summation of lengths and volume computation. This is useful in measuring large volumes or areas of objects with very long sides that exceed the whole length of the measuring tape. Pressing again SELECT key 10 will lead back to function one. In all these five functions, the current tape measurement is displayed on the tape measurement display 1 while the current computed value is displayed in the display 8. The computed value is stored automatically in the memory.

The +CASE key 6 is provided for wall to wall measurements which adds the length of the plastic casing of the tape measure to the actual tape reading for accurate measurements. The metric system has a resolution of 1 millimeter as will be explained below.

The tape measure has an auto-power-off timer which activates when the device is left idle for five minutes. If no keys are pressed, or the tape is not being drawn in or out of the casing for a complete span of five minutes the power will be switched OFF automatically.

Figure 2:
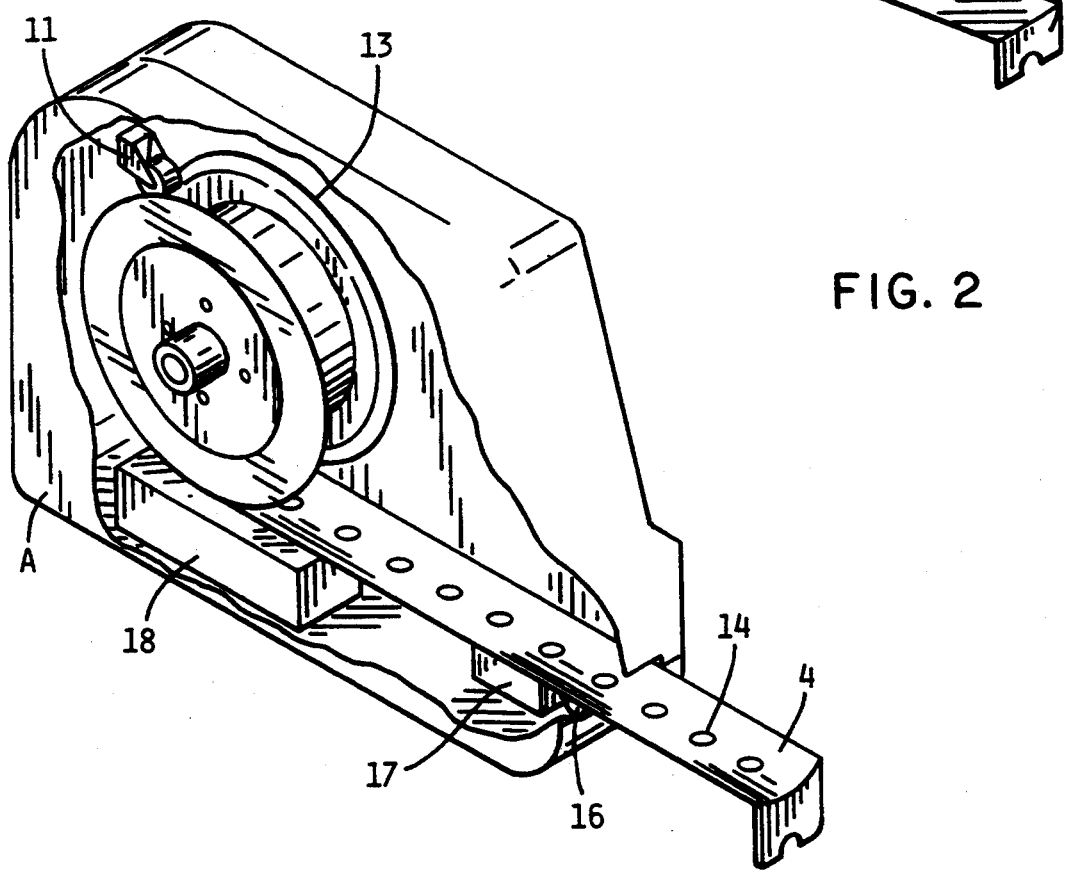
FIG. 2 is an isometric view of the measure and calculator with one side removed.

In FIG. 2, a mechanical calibration switch 16 is mounted near the mouth of the casing and used to reset a counter of a microprocessor to zero when the tape is totally retracted back into the casing A. A battery compartment 18 holds three AA batteries to provide a power supply. The plastic case A houses the extensible tape 4 wound around a spring-loaded spool 13 to enable the tape to retract by itself into the casing A. A guide roller 11 is mounted on springs and used to press against the tape and the spool 13 to make sure that the tape is wound around the spool uniformly as it retracts back into the casing. An optical sensing device 17 is positioned near the mouth of the casing to detect every pass of a hole and produce a signal to be inputted to the microprocessor. The microprocessor will either increment or decrement its counter depending on the movement of the tape, whether the tape is being drawn out or retracted back into the casing respectively.

Figure 3:
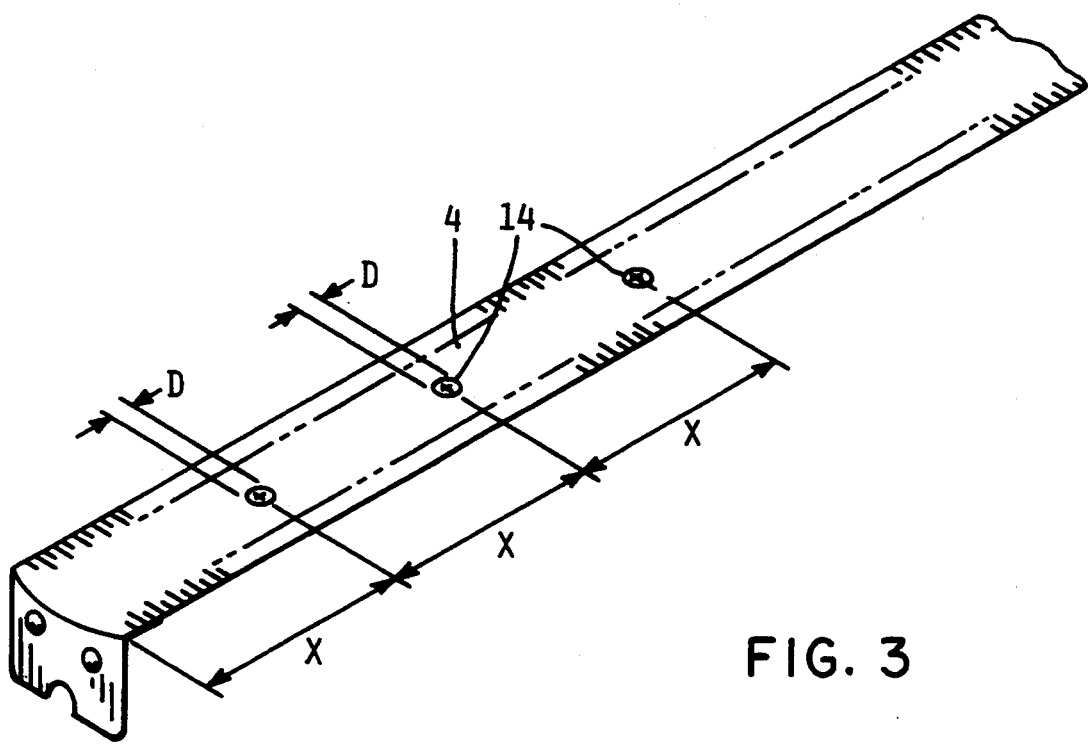
FIG. 3 shows part of the tape.
Figure 4:
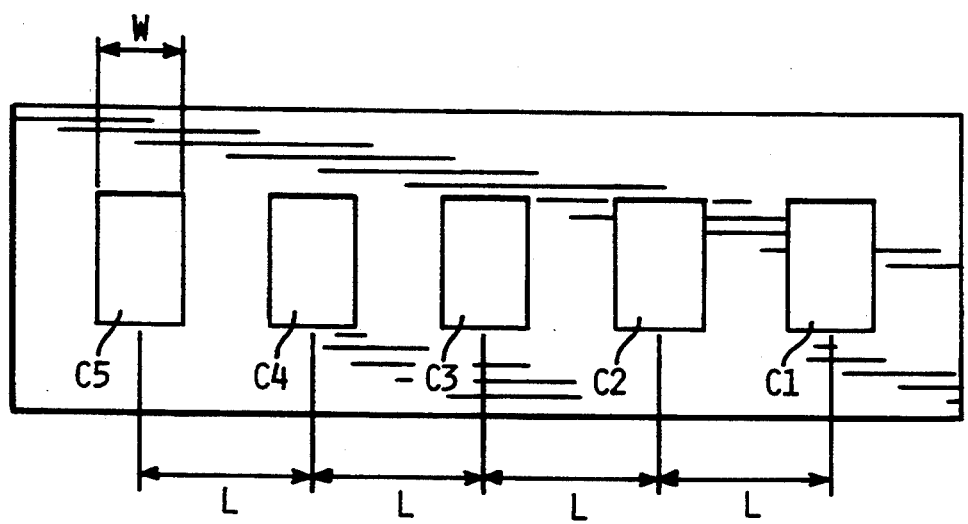
FIG. 4 shows a schematic layout of photocells for use in the measure and calculator.
Figure 5A:
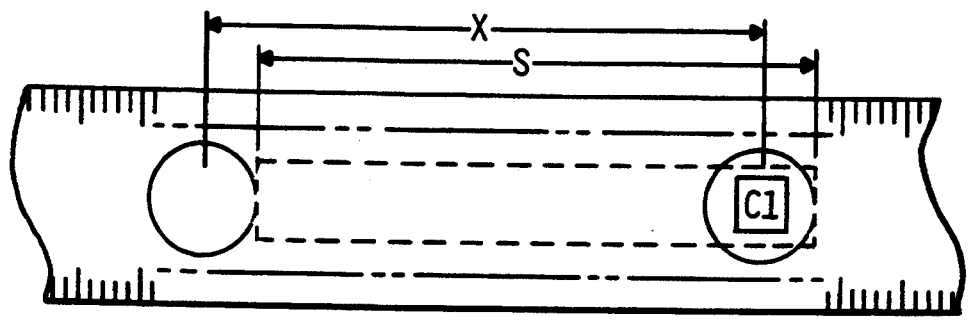
FIG. 5 shows some various possible positions of the tape relative to the photocells.
Figure 5B:
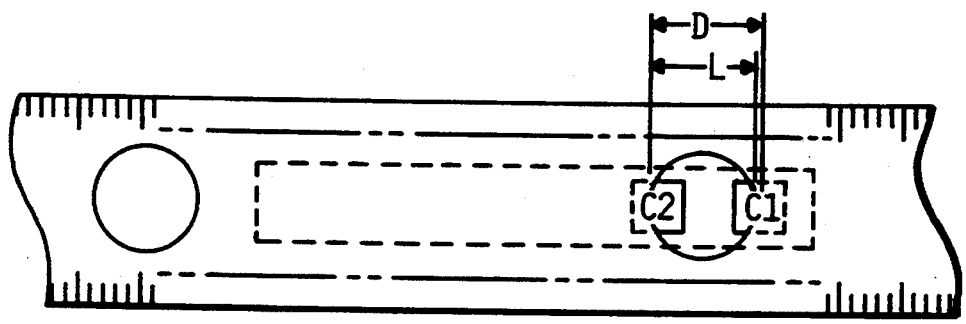
Figure 5C:
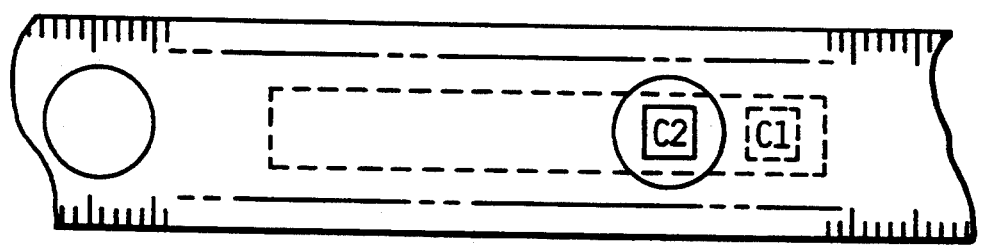
Figure 5D:
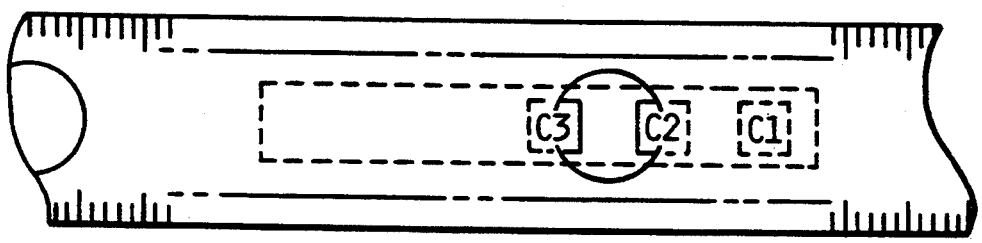

Referring to FIGS. 3 and 4, the tape 4 has equally spaced holes 14 (separated by a distance X equal to 1 cm) representing units of measurement which each have an effective lengthwise width D of approximately 2 mm. The optical sensor 17 (of FIG. 2) has five light detectors C1–C5 each with a field of view of approximately 1 mm. There are five detectors per centimeter evenly spaced with a mean separation L of 2 mm. The requirement is that while the tape is being moved past the sensor 17, each hole must be capable of exposing either one photocell or two "halves" of two adjacent photocells at any time to develop incremental unit monitoring signals for the microprocessor as explained more fully below.

In this example, the tape is arranged with holes at 1 cm. intervals and the sensor 17 has five photocells displaced over an overall effective distance of 1 cm. This provides a resolution for the tape measure of 1 mm.

If for example, the tape measure is provided for imperial units, the holes 14 can be spaced one inch apart and the sensor 17 arranged with eight equally spaced photocells (per inch) for providing a resolution of one sixteenth of an inch. If a resolution of one tenth of an inch is required, the sensor 17 is arranged with five photocells, and so on. The size and separation of the holes 14 and the number of photocells per hole separation determines the units for the tape measuring and the incremental units or resolution of measurement respectively. In each case, as mentioned above, the holes 14 in the tape must be arranged to expose one of the photocells, or two halves of adjacent photocells, to carry out proper monitoring of tape movement and provide the necessary incremental signals to be fed to the microprocessor. FIG. 5 shows for example four sequential positions where distinct incremental unit signals are provided for the microprocessor and FIG. 6 shows the binary logic sequence of a full set of incremental units of measurment; in this example a sequence of metric measurement is provided with a resolution of 1 mm.

Figure 7:
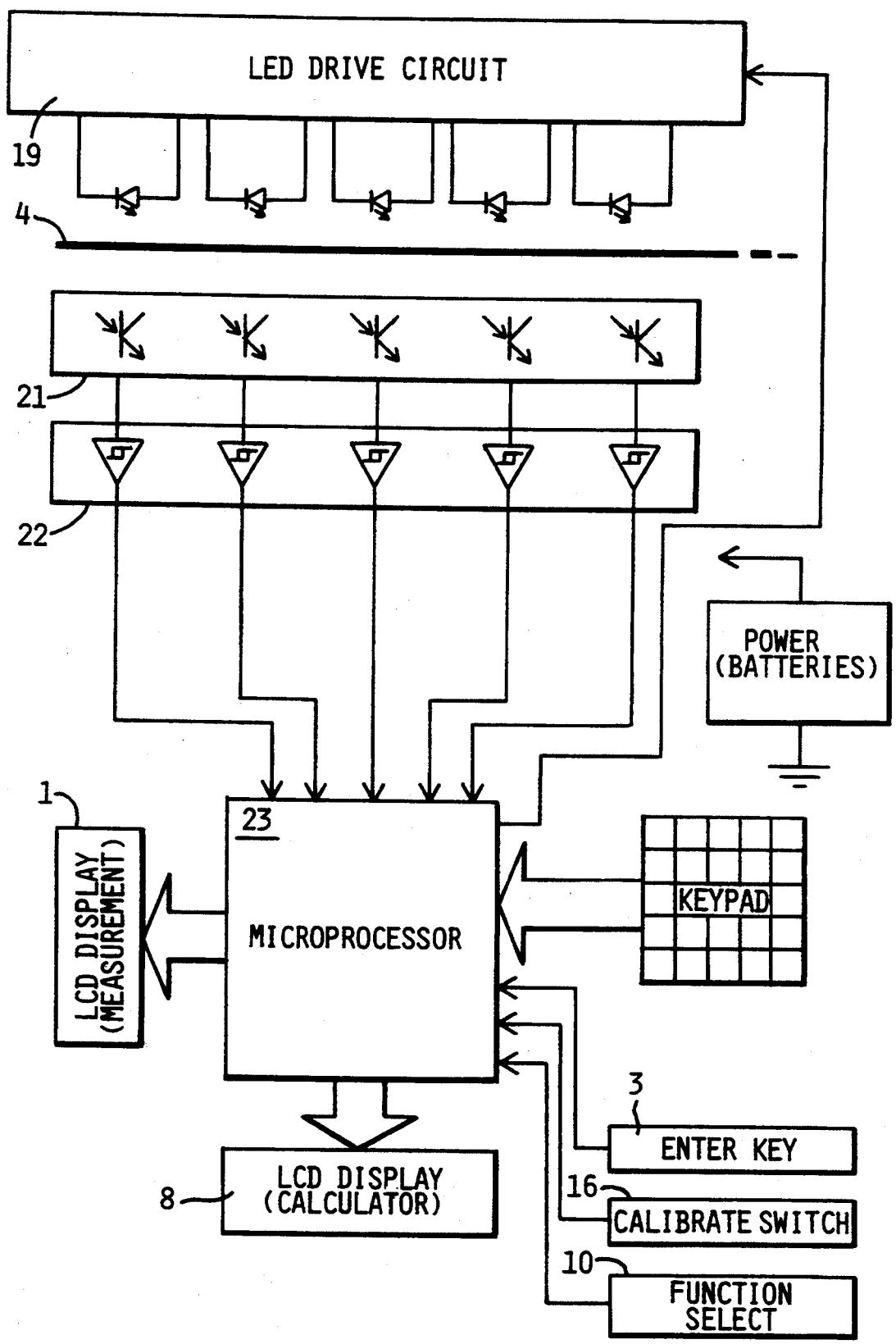
FIG. 7 is a block circuit diagram of the electric circuit for measure and calculator.

In FIG. 7, the circuit diagram includes the optical sensor 17 (of FIG. 2) consisting of five light emitting diodes 19 and five photocells 21. The tape 4 passes between the diodes 19 and the photocells 21 in use. Schmidt triggers 22 transform sine wave output signals from the photocells 22 to square waveforms and supply inputs for the microprocessor 23.

The microprocessor 23 has a stored program that controls all its function, performs all the mathematical computations, and drives the LCD displays 1 and 8. The signals provided by the Schmidt triggers 22 are translated by the microprocessor into the binary bit combinations which correspond to every digit from 0 to 9 (see FIG. 6). If a binary sequence is not provided as anticipated, that is following the sequential pattern "up" or "down" the sequence in FIG. 6, an error signal is generated and an error warning displayed. The transfer of logic condition 0 to 9 is also monitored (although any adjacent binary numbers in the sequence could be used for this) and used to provide an "up count" signal or a "down count" signal so that the display 1 is driven in the right direction as the tape moves in or out of the case A respectively.

It will be noted that a decoder circuit as such is not required because each incremental unit or digit 0 to 9, representing 1 mm, can be derived directly from the signals generated by photocells 21 in the sensor 17.

The described combined tape measure and calculator may be provided with an ultrasonic transmitter and receiver (not shown) which is normally used to make alternative approximate measurements. These measurements are also displayed on the display 1.

Whereas the described sensor 17 is an optical sensor having a light emitting diode for each photocell, a single diode or other light source can be used to flood-light the surface of the tape opposite the photocells. Also, magnetic, inductive coupling or other sensing may be used, instead of optical sensing, in a case where the unit "markings" on the tape are provided by suitable magnetic, inductive or other readable marks. The readable marks are likewise separated by incrementally related intervals and are arranged so that separate readings are performed by either one reading device or two adjacent reading devices at any one time in the manner as described above.

What is claimed is:

1. An electronic tape measure comprising a case having a digital display and including a microprocessor, an extendible tape wound on a reel in the case which can be withdrawn from the case to carry out measurements, a number of equally displaced readable unit markings on the tape, and a reader for reading the markings as the tape is moved out of and into the case, in which the reader has an array of separate reading devices aligned with the tape and separated from one another so that the array extends over a range of a length equal to the separation of markings on the tape, the markings and the reading devices being arranged so that a marking within the range of the array is read by a single reading device at one time and by two adjacent reading devices at another time, discrete sequential incremental signals being developed by the reader representing the position of the marking within the range of the array, the number of incremental signals corresponding to different positions of the marking along the length of the array being twice of the number of the reading devices in the array, the incremental signals developed by the reader being provided to the microprocessor for determining the length of the tape being withdrawn from the case.

2. A tape measure according to claim 1, wherein the unit markings comprise holes in the tape and the reading devices comprise photocells.

3. A tape measure according to claim 2, wherein the unit markings are arranged at one inch intervals.

4. A tape measure according to claim 2, wherein a digital calculator is mounted on the case, the case having a second digital display dedicated to the digital calculator.

5. A tape measure according to claim 4, wherein the measurements made by the tape are supplied to the calculator.

6. A tape measure according to claim 1 wherein the unit markings are arranged at one cm intervals along the length of the tape.

7. A tape measure according to claim 6 wherein five reading devices are arranged to generate incremental outputs to provide signals representing one tenth incremental units of the unit markings.

8. A tape measure according to claim 7, wherein a digital calculator is mounted on the case, the case having a second digital display dedicated to the digital calculator.

9. A tape measure according to claim 8, wherein the measurements made by the tape are supplied to the calculator.

10. A tape measure according to claim 6, wherein a digital calculator is mounted on the case, the case having a second digital display dedicated to the digital calculator.

11. A tape measure according to claim 10, wherein the measurements made by the tape are supplied to the calculator.

12. A tape measure according to claim 1 wherein the unit markings are arranged at one inch intervals.

13. A tape measure according to claim 12, wherein five reading devices are arranged to generate incremental outputs to provide signals representing one tenth incremental units of the unit markings.

14. A tape measure according to claim 12, wherein a digital calculator is mounted on the case, the case having a second [dedicated]digital display dedicated to the digital calculator.

15. A tape measure according to claim 14, wherein the measurements made by the tape are supplied to the calculator.

16. A tape measure according to claim 1, wherein a digital calculator is mounted on the case, the case having a second digital display dedicated to the digital calculator.

17. A tape measure according to claim 16, wherein the measurements made by the tape are supplied to the calculator.

* * * * *

UNITED STATES PATENT AND TRADEMARK OFFICE
CERTIFICATE OF CORRECTION

PATENT NO.    : 5,426,863

DATED         : JUNE 27, 1995

INVENTOR(S)   : EMIL J. BIGGEL

It is certified that error appears in the above-identified patent and that said Letters Patent is hereby corrected as shown below:

Column 2, line 38, after "If" insert -- a --.

Column 6, claim 14, line 30, delete "[dedicated]".

Signed and Sealed this

Fourteenth Day of November, 1995

Attest:

BRUCE LEHMAN

Attesting Officer

*Commissioner of Patents and Trademarks*